(12) United States Patent
Mun et al.

(10) Patent No.: US 12,486,434 B2
(45) Date of Patent: Dec. 2, 2025

(54) ADHESIVE FILM, SCATTERING PREVENTION FILM COMPRISING THE SAME AND OPTICAL DISPLAY APPARATUS COMPRISING THE SAME

(71) Applicant: SAMSUNG SDI CO., LTD., Yongin-si (KR)

(72) Inventors: Sung Hyun Mun, Suwon-si (KR); Ji Won Kang, Suwon-si (KR); Do Young Kim, Suwon-si (KR); Il Jin Kim, Suwon-si (KR); Ji Yeon Kim, Suwon-si (KR); Ji Ho Kim, Suwon-si (KR); Kyoung Gon Park, Suwon-si (KR); Dong Myeong Shin, Suwon-si (KR); Gwang Hwan Lee, Suwon-si (KR); Jin Young Lee, Suwon-si (KR); Jae Hyun Han, Suwon-si (KR); Ji Young Han, Suwon-si (KR); Se Mi Heo, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 217 days.

(21) Appl. No.: 17/179,992

(22) Filed: Feb. 19, 2021

(65) Prior Publication Data
US 2021/0261833 A1    Aug. 26, 2021

(30) Foreign Application Priority Data
Feb. 20, 2020   (KR) .................. 10-2020-0021181

(51) Int. Cl.
*C09J 133/08*    (2006.01)
*C08K 5/00*    (2006.01)
(Continued)

(52) U.S. Cl.
CPC ......... *C09J 133/066* (2013.01); *C08K 5/0025* (2013.01); *C08K 5/101* (2013.01);
(Continued)

(58) Field of Classification Search
None
See application file for complete search history.

(56) References Cited

U.S. PATENT DOCUMENTS

| 9,399,695 B2 * | 7/2016 | Kim ................. C09J 175/16 |
| 2005/0180607 A1 * | 8/2005 | Pabst ................. G01N 33/447 382/110 |
| 2017/0306194 A1 | 10/2017 | Kwak et al. |

FOREIGN PATENT DOCUMENTS

| CN | 103589348 A | * | 2/2014 |
| CN | 103911081 A | | 7/2014 |

(Continued)

OTHER PUBLICATIONS

Machine translation of CN 103589348 A (Year: 2014).*
(Continued)

*Primary Examiner* — Frank D Ducheneaux
(74) *Attorney, Agent, or Firm* — Womble Bond Dickinson (US) LLP

(57) ABSTRACT

An adhesive film, a scattering prevention film including the same, and an optical display apparatus including the same are provided. An adhesive film is formed of an adhesive composition including: a polymerization product including a hydroxyl group-containing (meth)acrylic copolymer; and an alkylene oxide cross-linking agent. The adhesive film contains a substituted monocyclic cyclyloxy group and has a peel strength of about 950 gf/in or more, as measured with respect to a glass plate at about 25° C.

17 Claims, 1 Drawing Sheet

(51) Int. Cl.
  *C08K 5/101* (2006.01)
  *C08K 5/103* (2006.01)
  *C09J 7/10* (2018.01)
  *C09J 7/29* (2018.01)
  *C09J 133/06* (2006.01)
  *C09J 133/14* (2006.01)
  *C09J 133/24* (2006.01)
  *G02B 1/10* (2015.01)
  *G02B 1/11* (2015.01)
  *G02B 1/14* (2015.01)
  *G02B 1/18* (2015.01)

(52) U.S. Cl.
  CPC ............... *C08K 5/103* (2013.01); *C09J 7/10* (2018.01); *C09J 7/29* (2018.01); *C09J 133/08* (2013.01); *C09J 133/14* (2013.01); *C09J 133/24* (2013.01); *G02B 1/10* (2013.01); *G02B 1/11* (2013.01); *G02B 1/14* (2015.01); *G02B 1/18* (2015.01); *C09J 2203/318* (2013.01); *C09J 2301/122* (2020.08); *C09J 2301/312* (2020.08); *C09J 2301/408* (2020.08); *C09J 2433/00* (2013.01); *C09J 2467/006* (2013.01)

(56) References Cited

FOREIGN PATENT DOCUMENTS

| | | | |
|---|---|---|---|
| CN | 106978111 A | | 7/2017 |
| JP | 2008031208 A | * | 2/2008 |
| KR | 10-2015-0104532 A | | 9/2015 |
| KR | 10-1687478 B1 | | 12/2016 |
| KR | 2017069819 A | * | 6/2017 ............ C09J 133/10 |

OTHER PUBLICATIONS

Machine translation of JP 2008031208A (Year: 2008).*
Machine translation of KR-2017069819-A (Year: 2017).*
Chinese Office Action in corresponding Chinese Patent Application No. 202110189719.4, Chinese Office Action issued Mar. 21, 2022 (6 pgs.).

* cited by examiner

ADHESIVE FILM, SCATTERING PREVENTION FILM COMPRISING THE SAME AND OPTICAL DISPLAY APPARATUS COMPRISING THE SAME

CROSS-REFERENCE TO RELATED APPLICATION

This application claims priority to and the benefit of Korean Patent Application No. 10-2020-0021181, filed on Feb. 20, 2020 in the Korean Intellectual Property Office, the entire disclosure of which is incorporated herein by reference.

BACKGROUND

1. Field

Aspects of embodiments of the present invention relate to an adhesive film, a scattering prevention film including the same, and an optical display apparatus including the same.

2. Description of the Related Art

An optical display apparatus includes display elements including a window film, a conductive film, and an organic light emitting diode. In the optical display apparatus, various display elements may be adhesively attached via an optically clear adhesive (OCA) film. Recently, a flexible optical display apparatus has been developed as an optical display apparatus. Thus, the adhesive film also needs to have good flexural reliability.

Glass may be used for a touch panel, a touch screen, or a window film. Recently, thin flexible glass for flexible display apparatuses has been developed. However, such flexible glass can also be broken by an external impact. Accordingly, a scattering prevention film is needed to prevent scattering of glass fragments upon breakage of the flexible glass. The scattering prevention film generally includes a base film and an adhesive film formed on the base film.

Therefore, there is a need for an adhesive film for foldable display apparatuses, which is highly effective in scattering prevention while having good flexural reliability.

The background technique of the present invention is disclosed in Korean Patent Registration No. 10-1687478.

SUMMARY

According to an aspect of embodiments of the present invention, an adhesive film which is highly effective in scattering prevention is provided.

According to another aspect of embodiments of the present invention, an adhesive film which has good flexural reliability and can be used in foldable display apparatuses is provided.

According to another aspect of embodiments of the present invention, an adhesive film which has high peel strength with respect to both a glass plate and a base film is provided.

According to one or more embodiments of the present invention, an adhesive film is formed of an adhesive composition including: a polymerization product including a hydroxyl group-containing (meth)acrylic copolymer; and an alkylene oxide cross-linking agent, the adhesive film containing a substituted monocyclic cyclyloxy group and having a peel strength of about 950 gf/in or more, as measured with respect to a glass plate at about 25° C.

The monocyclic cyclyloxy group may be a $C_5$ to $C_{10}$ monocyclic cyclyloxy group.

The substituted monocyclic cyclyloxy group may be obtained by substituting a hydrogen atom thereof with a methyl group or a branched $C_3$ to $C_{10}$ alkyl group.

The substituted monocyclic cyclyloxy group may be derived from at least one selected from among trimethylcyclohexyl (meth)acrylate and tert-butylcyclohexyl (meth)acrylate.

The alkylene oxide cross-linking agent may have an ethylene oxide group or a propylene oxide group and two to six (meth)acrylate groups.

The polymerization product may include a polymerization product of a monomer mixture including a hydroxyl group-containing (meth)acrylate, an alkyl group-containing (meth)acrylate, and a heteroalicyclic group-containing monomer.

The monomer mixture may include about 5 wt % to about 40 wt % of the hydroxyl group-containing (meth)acrylate, about 50 wt % to about 90 wt % of the alkyl group-containing (meth)acrylate, and about 1 wt % to about 20 wt % of the heteroalicyclic group-containing monomer.

The monomer mixture may be free from at least one (meth)acrylate having the substituted monocyclic cyclyloxy group.

The adhesive composition may include the polymerization product, the alkylene oxide cross-linking agent, and a substituted monocyclic cyclyloxy group-containing (meth)acrylate.

The alkylene oxide cross-linking agent may be present in an amount of about 0.01 parts by weight to about 5 parts by weight relative to about 100 parts by weight of the polymerization product.

The substituted monocyclic cyclyloxy group-containing (meth)acrylate may include at least one selected from among trimethylcyclohexyl (meth)acrylate and tert-butylcyclohexyl (meth)acrylate.

The substituted monocyclic cyclyloxy group-containing (meth)acrylate may be present in an amount of about 0.5 parts by weight to less than about 20 parts by weight relative to about 100 parts by weight of the polymerization product.

The adhesive composition may further include a photoinitiator.

The adhesive film may have a storage modulus of about 200 kPa or less at about 25° C.

According to one or more embodiments of the present invention, a scattering prevention film includes: a base film; and an adhesive film on a lower surface of the base film, the adhesive film comprising the adhesive film according to the present invention.

The scattering prevention film may further include a functional coating layer on an upper surface of the base film, the functional coating layer including at least one selected from among an anti-fingerprint layer, a hard coating layer, a UV absorbing layer, and a low-reflectivity layer.

According to one or more embodiments of the present invention, an optical display apparatus includes the adhesive film according to the present invention or the scattering prevention film according to the present invention.

According to an aspect of embodiments of the present invention, an adhesive film which is highly effective in scattering prevention is provided.

According to another aspect of embodiments of the present invention, an adhesive film which has good flexural reliability and thus can be used in foldable display apparatuses is provided.

According to another aspect of embodiments of the present invention, an adhesive film which has high peel strength with respect to both a glass plate and a base film is provided.

DETAILED DESCRIPTION

Figure 1A:
FIG. 1A shows a cross-sectional view of a specimen for evaluation of flexural reliability in an experimental example.

Embodiments of the present invention will be described in further detail with reference to the accompanying drawings to provide a thorough understanding of the invention to those skilled in the art. It should be understood that the present invention may be embodied in different ways and is not limited to the following embodiments.

As used herein, the term "(meth)acrylic" refers to acrylic and/or methacrylic.

As used herein, the term "copolymer" may include a prepolymer, an oligomer, a polymer, or a resin.

As used herein, the term "modulus" refers to storage modulus (G').

Herein, "peel strength" of an adhesive film with respect to a glass plate is a value measured on an adhesive film specimen at a peel rate of 300 mm/min and a peel angle of about 180° at about 25° C. using a peel strength tester, the specimen is prepared by cutting an adhesive sheet (polyethylene terephthalate (PET) film/adhesive film/PET film) into a size of 2.5 cm×10 cm (width×length), removing one PET film from the resultant to expose one surface of the adhesive film, attaching the one surface of the adhesive film to a glass plate having a size of 5 cm×12 cm (width×length), allowing a 2 kg roller to pass over the other PET film once, and leaving the resultant at about 25° C. for about 30 minutes. Here, the peel strength tester may be a TA.XT_Plus texture analyzer (Stable Micro System), without being limited thereto.

Herein, "peel strength" of an adhesive film with respect to a PET film is a value measured in the same manner as in measurement of peel strength with respect to a glass plate except that the PET film is used instead of the glass plate.

As used herein, the term "homopolymer glass transition temperature" may refer to a glass transition temperature (Tg) measured on a homopolymer of a target monomer using a differential scanning calorimeter (DSC Discovery, TA Instruments). Specifically, the homopolymer of the target monomer is heated to about 180° C. at a heating rate of about 20° C./min, is slowly cooled to about −100° C., and is heated to about 100° C. at a heating rate of 10° C./min, thereby obtaining data of an endothermic transition curve, followed by determination of the homopolymer glass transition temperature by an inflection point of the endothermic transition curve.

Herein, an adhesive film according to an embodiment of the present invention will be described.

The adhesive film according to one embodiment of the present invention (herein, "adhesive film") is formed of an adhesive composition including: a polymerization product including a hydroxyl group-containing (meth)acrylic copolymer, and an alkylene oxide cross-linking agent, and contains a substituted monocyclic cyclyloxy group.

The adhesive film contains the substituted monocyclic cyclyloxy group. As will be described in further detail below, the adhesive film may be used to fabricate a scattering prevention film. The scattering prevention film includes a base film and an adhesive film formed on a lower surface of the base film, and an adherend to which the scattering prevention film is applied is a glass plate. With the substituted monocyclic cyclyloxy group contained therein, the adhesive film according to the present invention has high peel strength with respect to both the glass plate and the base film and thus can be used for the scattering prevention film. In addition, the adhesive film has good flexural reliability under thermal shock conditions and thus can be used in flexible or foldable display apparatuses.

In an embodiment, the adhesive film may have a peel strength of about 950 gf/in or more, for example, about 950 gf/in to about 2,000 gf/in (for example, 950 gf/in, 960 gf/in, 970 gf/in, 980 gf/in, 990 gf/in, 1,000 gf/in, 1,010 gf/in, 1,020 gf/in, 1030 gf/in, 1,040 gf/in, 1,050 gf/in, 1060 gf/in, 1,070 gf/in, 1,080 gf/in, 1,090 gf/in, 1,100 gf/in, 1,110 gf/in, 1,120 gf/in, 1,130 gf/in, 1,140 gf/in, 1,150 gf/in, 1,160 gf/in, 1,170 gf/in, 1,180 gf/in, 1,190 gf/in, 1,200 gf/in, 1,210 gf/in, 1,220 gf/in, 1,230 gf/in, 1,240 gf/in, 1,250 gf/in, 1,260 gf/in, 1,270 gf/in, 1,280 gf/in, 1,290 gf/in, 1,300 gf/in, 1,310 gf/in, 1,320 gf/in, 1,330 gf/in, 1,340 gf/in, 1,350 gf/in, 1,360 gf/in, 1,370 gf/in, 1,380 gf/in, 1,390 gf/in, 1,400 gf/in, 1,410, gf/in 1,420 gf/in, 1,430 gf/in, 1,440 gf/in, 1,450 gf/in, 1,460 gf/in, 1,470 gf/in, 1,480 gf/in, 1,490 gf/in, 1,500 gf/in, 1,510 gf/in, 1,520 gf/in, 1,530 gf/in, 1,540 gf/in, 1,550 gf/in, 1,560 gf/in, 1,570 gf/in, 1,580 gf/in, 1,590 gf/in, 1,600 gf/in, 1,610 gf/in, 1,620 gf/in, 1,630 gf/in, 1,640 gf/in, 1,650 gf/in, 1,660 gf/in, 1,670 gf/in, 1,680 gf/in, 1,690 gf/in, 1,700 gf/in, 1,710 gf/in, 1,720 gf/in, 1,730, gf/in 1,740 gf/in, 1,750 gf/in, 1,760 gf/in, 1,770 gf/in, 1,780 gf/in, 1,790 gf/in, 1,800 gf/in, 1,810 gf/in, 1,820 gf/in, 1,830 gf/in, 1,840 gf/in, 1,850, gf/in 1,860 gf/in, 1,870 gf/in, 1,880 gf/in, 1,890 gf/in, 1,900 gf/in, 1,910 gf/in, 1,920 gf/in, 1,930 gf/in, 1,940 gf/in, 1,950 gf/in, 1,960 gf/in, 1,970 gf/in, 1,980 gf/in, 1,990 gf/in, or 2,000 gf/in), as measured with respect to the glass plate at about 25° C. Within this range, the glass plate with the adhesive film attached thereto can be prevented or substantially prevented from scattering when broken.

In an embodiment, the adhesive film may have a peel strength of about 950 gf/in or more, for example, about 950 gf/in to 2,000 gf/in or about 1,100 gf/in to 2,000 gf/in, as measured with respect to the base film, for example, a polyethylene terephthalate film, at about 25° C. Within this range, the glass plate with the adhesive film attached thereto can be prevented or substantially prevented from scattering when broken.

In an embodiment, the peel strength of the adhesive film with respect to the base film at about 25° C. may be greater than the peel strength of the adhesive film with respect to the glass plate at about 25° C. For example, a ratio of peel strength of the adhesive film with respect to the base film at about 25° C. to peel strength of the adhesive film with respect to the glass plate at about 25° C. may be about 1.1 or more, and, in an embodiment, about 1.1 to 2.

The substituted monocyclic cyclyloxy group refers to a monocyclic cyclyloxy group in which at least one hydrogen atom is substituted with a substituent selected from among a $C_1$ to $C_{10}$ alkyl group, a $C_6$ to $C_{20}$ aryl group, and a $C_7$ to $C_{20}$ arylalkyl group. An adhesive film containing an unsubstituted cyclyloxy group has peel strength less than the range set forth herein or has poor flexural reliability under thermal shock conditions.

Here, the number of substituted hydrogen atoms in the monocyclic cyclyloxy group may range from one to six, and, in an embodiment, one to four. In addition, one or more substituents may be bonded to a carbon atom constituting the cyclyloxy group.

In an embodiment, the $C_1$ to $C_{10}$ alkyl group is a linear or branched alkyl group, and may include any of a methyl group, an ethyl group, an n-propyl group, an iso-propyl group, an n-butyl group, an iso-butyl group, a tert-butyl group, an n-pentyl group, an iso-pentyl group, an n-hexyl group, an iso-hexyl group, an n-heptyl group, an iso-heptyl group, an n-octyl group, an iso-octyl group, a 2-ethylhexyl group, an n-nonyl group, an iso-nonyl group, and the like.

In an embodiment, the $C_1$ to $C_{10}$ alkyl group is a branched alkyl group, such as a methyl group or a tert-butyl group.

In an embodiment, the $C_6$ to $C_{20}$ aryl group is a monocyclic or polycyclic aryl group, and may include any of a phenyl group, a biphenyl group, a naphthyl group, and the like. In an embodiment, the $C_7$ to $C_{20}$ arylalkyl group may include a benzyl group and the like.

In an embodiment, the substituent is the $C_1$ to $C_{10}$ alkyl group. The $C_1$ to $C_{10}$ alkyl group has high compatibility with the alkylene oxide cross-linking agent and can provide a synergistic effect in improving peel strength and flexibility of the adhesive film according to the present invention.

In an embodiment, the substituted monocyclic cyclyloxy group is a $C_5$ to $C_{10}$ monocyclic cyclyloxy group. Use of the $C_5$ to $C_{10}$ monocyclic cyclyloxy group can improve scattering prevention performance of the adhesive film by increasing peel strength with respect to the glass plate and can help to improve flexural reliability of the adhesive under thermal shock conditions. In an embodiment, the (substituted) cyclyloxy group may be a cyclopentyloxy group, a cyclohexyloxy group, a cycloheptyloxy group, or a cyclooctyloxy group.

The alkylene oxide cross-linking agent improves flexural reliability of the adhesive film containing the substituted monocyclic cyclyloxy group under thermal shock conditions. The inventors of the present invention confirmed that, as compared with other cross-linking agents, the alkylene oxide cross-linking agent is highly effective in improving flexibility of the adhesive film disposed between the base film and the glass plate under thermal shock conditions without affecting peel strength of the adhesive film, which originates from the substituted monocyclic cyclyloxy group.

Regarding flexural reliability, the adhesive film may have a storage modulus of about 200 kPa or less, for example, about 30 kPa to 80 kPa, at about 25° C. Within this range, the adhesive film can have good flexural reliability.

Regarding flexural reliability, the adhesive film may have a storage modulus of less than about 100 kPa at about −20° C. Within this range, the adhesive film can have good flexibility at low temperature and thus good flexural reliability under thermal shock conditions. In an embodiment, the adhesive film has a storage modulus of about 40 kPa to less than 100 kPa, and, in an embodiment, more than about 50 kPa and less than 100 kPa, at about −20° C.

The adhesive film may have a storage modulus of about 50 kPa or less, for example, about 10 kPa to 50 kPa or about 15 kPa to 30 kPa, at about 85° C. Within this range, the adhesive film can have good flexural reliability under thermal shock due to exposure to a sudden and rapid change in temperature.

The alkylene oxide cross-linking agent includes a cross-linking agent containing *-(—RO—)-* (where * is a binding site and R is a substituted or unsubstituted $C_2$ to $C_5$ alkylene group) as an alkylene oxide group. Here, the $C_2$ to $C_5$ alkylene group may be an ethylene oxide group, a propylene oxide group, or the like, and, in an embodiment, an ethylene oxide group. In an embodiment, the alkylene oxide cross-linking agent contains two to six, and, in an embodiment, three to five (meth)acrylate groups as a photocurable functional group. Thus, the alkylene oxide cross-linking agent can form the adhesive film through cross-linking with the hydroxyl group-containing (meth)acrylic copolymer.

The polymerization product including the hydroxyl group-containing (meth)acrylic copolymer can contribute to forming a matrix of the adhesive film and providing peel strength to the adhesive film.

The hydroxyl group-containing (meth)acrylic copolymer may be formed of a monomer mixture including a hydroxyl group-containing (meth)acrylate, an alkyl group-containing (meth)acrylate, and a heteroalicyclic group-containing monomer. Herein, the term "heteroalicyclic group" refers to an alicyclic group containing at least one selected from among nitrogen, oxygen, and sulfur, and, in an embodiment, at least two identical or different elements selected from among nitrogen, oxygen, and sulfur, per carbon ring, and, in an embodiment, refers to a morpholinyl group.

The hydroxyl group-containing (meth)acrylate imparts adhesion to the adhesive film. The hydroxyl group-containing (meth)acrylate may be a $C_1$ to $C_{10}$ (meth)acrylate containing at least one hydroxyl group. For example, the hydroxyl group-containing (meth)acrylate may include at least one selected from among 2-hydroxybutyl (meth)acrylate, 4-hydroxybutyl (meth)acrylate, 2-hydroxyethyl (meth)acrylate, 2-hydroxypropyl (meth)acrylate, 3-hydroxypropyl (meth)acrylate, and 6-hydroxyhexyl (meth)acrylate. In an embodiment, the hydroxyl group-containing (meth)acrylate includes at least one selected from among 2-hydroxyethyl (meth)acrylate and 4-hydroxybutyl (meth)acrylate. In this case, the effects of the present invention can be better realized.

In an embodiment, the hydroxyl group-containing (meth) acrylate may have a homopolymer glass transition temperature of about 0° C. to about −70° C., and, in an embodiment, about −10° C. to about −60° C., and, in an embodiment, about −10° C. to about −50° C. Within this range, the adhesive film can have further improved peel strength and flexural reliability.

The hydroxyl group-containing (meth)acrylate may be present in an amount of about 5 wt % to about 40 wt % (for example, about 5 wt % to 30 wt % or about 5 wt % to 20 wt %) in the monomer mixture. Within this range, the hydroxyl group-containing (meth)acrylate can help to achieve reversible change in peel strength of the adhesive film.

The alkyl group-containing (meth)acrylate can form a matrix of the adhesive film. In an embodiment, the alkyl group-containing (meth)acrylate may include an unsubstituted linear or branched $C_1$ to $C_{10}$ alkyl group-containing (meth)acrylate. For example, the alkyl group-containing (meth)acrylate may include at least one selected from among 2-ethylhexyl (meth)acrylate, n-butyl (meth)acrylate, isooctyl (meth)acrylate, propyl (meth)acrylate, t-butyl (meth)acrylate, iso-butyl (meth)acrylate, pentyl (meth)acrylate, hexyl (meth)acrylate, heptyl (meth)acrylate, octyl (meth)acrylate, nonyl (meth)acrylate, and decyl (meth)acrylate. In an embodiment, the alkyl group-containing (meth)acrylate is an unsubstituted branched alkyl group-containing (meth) acrylate and includes at least one selected from among 2-ethylhexyl (meth)acrylate and isooctyl (meth)acrylate, more preferably 2-ethylhexyl (meth)acrylate.

In an embodiment, the alkyl group-containing acrylate may have a homopolymer glass transition temperature of about −20° C. to −80° C., and, in an embodiment, about −40° C. to −80° C. Within this range, the adhesive film can have good flexural reliability under low temperature/high temperature and high humidity conditions.

The alkyl group-containing acrylate may be present in an amount of about 50 wt % to about 90 wt % (for example, 5 wt %, 10 wt %, 15 wt %, 20 wt %, 25 wt %, 30 wt %, 35 wt %, or 40 wt %), and, in an embodiment, about 60 wt % to 85 wt % or about 65 wt % to 85 wt %, in the monomer mixture. Within this range, the adhesive film can have good flexural reliability under low temperature/high temperature and high humidity conditions.

The heteroalicyclic group-containing monomer can help to increase peel strength of the adhesive film. The heteroalicyclic group-containing monomer may include at least one selected from N-(meth)acryloylmorpholine and N-(meth)acryloylpyrrolidone. In an embodiment, the heteroalicyclic group-containing monomer contains a morpholine group, and, in an embodiment, N-(meth)acryloylmorpholine, which is suitable for increasing peel strength of the adhesive film at room temperature.

The heteroalicyclic group-containing monomer may be present in an amount of about 1 wt % to 20 wt % (for example, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %), and, in an embodiment, 1 wt % to 15 wt % or 1 wt % to 10 wt %, in the monomer mixture. Within this range, the adhesive film can have good flexural reliability under low temperature/high temperature and high humidity conditions.

The monomer mixture may further include a copolymerizable monomer in addition to the hydroxyl group-containing (meth)acrylate, the alkyl group-containing (meth)acrylate, and the heteroalicyclic group-containing monomer. When included in the monomer mixture or the hydroxyl group-containing (meth)acrylic copolymer, the copolymerizable monomer can impart additional desired properties to the adhesive film. The copolymerizable monomer is different from the monomers described above, and may include at least one selected from among an amine group-containing monomer, an alkoxy group-containing monomer, a phosphate group-containing monomer, a sulfonate group-containing monomer, a phenyl group-containing monomer, a silane group-containing monomer, a carboxylate group-containing monomer, and an amide group-containing monomer.

The amine group-containing monomer may include any of amine group-containing acrylic monomers, such as monomethylaminoethyl acrylate, monoethylaminoethyl acrylate, monomethylaminopropyl acrylate, monoethylaminopropyl acrylate, dimethylaminoethyl acrylate, diethylaminoethyl acrylate, N-tert-butylaminoethyl acrylate, and acryloxyethyltrimethylammonium chloride acrylate, without being limited thereto.

The alkoxy group-containing monomer may include any of 2-methoxyethyl acrylate, 2-methoxypropyl acrylate, 2-ethoxypropyl acrylate, 2-butoxypropyl acrylate, 2-methoxypentyl acrylate, 2-ethoxypentyl acrylate, 2-butoxyhexyl acrylate, 3-methoxypentyl acrylate, 3-ethoxypentyl acrylate, and 3-butoxyhexyl acrylate, without being limited thereto.

The phosphate group-containing monomer may include any of phosphate group-containing acrylic monomers, such as 2-methacryloyloxyethyldiphenylphosphate acrylate, trimethacryloyloxyethylphosphate acrylate, and triacryloyloxyethylphosphate acrylate, without being limited thereto.

The sulfonate group-containing monomer may include any of sulfonate group-containing acrylic monomers, such as sodium sulfopropyl acrylate, sodium 2-sulfoethyl acrylate, and sodium 2-acrylamido-2-methylpropane sulfonate, without being limited thereto.

The phenyl group-containing monomer may include any of phenyl group-containing acrylic vinyl monomers, such as p-tert-butylphenyl acrylate, o-biphenyl acrylate, and phenoxyethyl acrylate, without being limited thereto.

The silane group-containing monomer may include any of silane group-containing vinyl monomers, such as 2-acetoacetoxyethyl acrylate, vinyl trimethoxysilane, vinyl triethoxysilane, vinyl tris(2-methoxyethyl)silane, vinyl triacetoxysilane, and acryloyloxypropyltrimethoxysilane, without being limited thereto.

The carboxylate group-containing monomer may include any of acrylic acid, 2-carboxyethyl acrylate, 3-carboxypropyl acrylate, 4-carboxybutyl acrylate, itaconic acid, crotonic acid, maleic acid, fumaric acid, and maleic anhydride, without being limited thereto.

The amide group-containing monomer may include any of acrylamide, N-methylacrylamide, N-methylolacrylamide, N-methoxymethylacrylamide, N,N-methylenebisacrylamide, N-hydroxyethylacrylamide, and N,N-diethylacrylamide, without being limited thereto.

The copolymerizable monomer may be present in an amount of about 30 wt % or less, and, in an embodiment, about 0 wt % to 30 wt %, in the monomer mixture. Within this range, adhesion of the adhesive film to an adherend can be properly adjusted and optical properties of the adhesive film can be further improved.

The monomer mixture may further include a substituted monocyclic cyclyloxy group-containing (meth)acrylate. In this case, the substituted monocyclic cyclyloxy group-containing (meth)acrylate may be polymerized along with the monomer mixture to provide the substituted monocyclic cyclyloxy group to the adhesive film.

The substituted monocyclic cyclyloxy group-containing (meth)acrylate is a (meth)acrylate having the substituted monocyclic cyclyloxy group as described above, and may include, for example, trimethylcyclohexyl (meth)acrylates, such as 3,3,5-trimethylcyclohexyl (meth)acrylate, and tert-butylcyclohexyl (meth)acrylates, such as 4-tert-butylcyclohexyl (meth)acrylate.

The substituted monocyclic cyclyloxy group-containing (meth)acrylate may be present in an amount of about 10 wt % or less, for example, about 0 wt % to about 10 wt % or about 0.1 wt % to about 10 wt %, in the monomer mixture.

The adhesive film is formed of the adhesive composition as described above. In an embodiment, the adhesive film may prepared by applying the adhesive composition to a release film, followed by photocuring. Here, photocuring may include irradiation with a wavelength of about 300 nm to 400 nm at a fluence of 400 mJ/cm$^2$ to 3,000 mJ/cm$^2$ using a low-pressure lamp under oxygen-free conditions. However, it is to be understood that the present invention is not limited thereto and the irradiation wavelength and fluence may be varied depending on the thickness of the adhesive film and irradiation conditions.

The adhesive film may have a haze of 2% or less, and, in an embodiment, 0.1% to 1%, and a total luminous transmittance of 90% or more, and, in an embodiment, 95% to 99%, as measured with respect to light in the visible spectrum (for example, 380 nm to 780 nm). Within these ranges, the adhesive film can have good optical transparency and thus can be used in optical display apparatuses.

The adhesive film may have a thickness of 10 μm to 300 μm, and, in an embodiment, 12 μm to 175 μm. Within this range, the adhesive film can be used in optical display apparatuses.

In an embodiment, the adhesive film may be free from particles such as organic nanoparticles having a core-shell structure.

Next, the adhesive composition will be described in further detail.

In an embodiment, the adhesive composition includes: the polymerization product obtained by polymerization of the monomer mixture; the alkylene oxide cross-linking agent; the substituted monocyclic cyclyloxy group-containing (meth)acrylate; and a photoinitiator.

The polymerization product is obtained by adding an amount (e.g., a predetermined amount) of the photoinitiator to the monomer mixture, followed by polymerization. The photoinitiator may include at least one selected from among photoinitiators described further below. Here, the monomer mixture is free from the substituted cyclyloxy group-containing (meth)acrylate.

The polymerization product includes the hydroxyl group-containing (meth)acrylic copolymer as described above. In an embodiment, the polymerization product may include the hydroxyl group-containing (meth)acrylic copolymer and unpolymerized monomer residues.

The alkylene oxide cross-linking agent may be present in an amount of 0.01 parts by weight to 5 parts by weight, and, in an embodiment, 0.01 parts by weight to 1 part by weight, relative to 100 parts by weight of the hydroxyl group-containing (meth)acrylic copolymer, the polymerization product, or the monomer mixture. Within this range, the adhesive film can have improved flexibility.

The substituted monocyclic cyclyloxy group-containing (meth)acrylate provides the substituted monocyclic cyclyloxy group to the adhesive film.

The substituted monocyclic cyclyloxy group-containing (meth)acrylate may be present in an amount of 0.5 parts by weight to less than 20 parts by weight, and, in an embodiment, 1 part by weight to 10 parts by weight, relative to 100 parts by weight of the hydroxyl group-containing (meth) acrylic copolymer, the polymerization product, or the monomer mixture. Within this range, the adhesive film can be used for the scattering prevention film due to high peel strength thereof while exhibiting good reliability under high temperature/high humidity conditions (60° C./95% RH).

In an embodiment, the adhesive composition includes the photoinitiator.

The photoinitiator may allow the adhesive composition to be cured to form the adhesive film, or may allow the monomer mixture to be completely or partially polymerized to form the hydroxyl group-containing (meth)acrylic copolymer.

The photoinitiator may include any photoinitiator that can induce polymerization reaction or curing reaction by generating radicals during photocuring through light irradiation or the like. For example, the photoinitiator may be a photoradical initiator and may include any of benzoin, hydroxy ketone, amino ketone, and phosphine oxide photoinitiators. In an embodiment, the photoinitiator may include any of benzoin, benzoin methyl ether, benzoin ethyl ether, benzoin isopropyl ether, benzoin n-butyl ether, benzoin isobutyl ether, acetophenone compounds, such as 2,2-dimethoxy-2-phenylacetophenone, 2,2'-diethoxyacetophenone, 2,2'-dibutoxyacetophenone, 2-hydroxy-2-methylpropiophenone, p-t-butyltrichloroacetophenone, p-t-butyldichloroacetophenone, 4-chloroacetophenone, 2,2'-dichloro-4-phenoxyacetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 2-benzyl-2-dimethylamino-1-(4-morpholinophenyl)-butan-1-one, 1-hydroxycyclohexylphenylketone, 2-methyl-1-[4-(methylthio)phenyl]-2-morpholino-propan-1-one, and 4-(2-hydroxyethoxy)phenyl-2-(hydroxy-2-propyl)ketone, benzophenone, p-phenylbenzophenone, 4,4-bis-diethylaminobenzophenone. dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylamino benzoic acid ester, oligo[2-hydroxy-2-methyl-1-[4-(1-methylvinyl)phenyl]propanone], 2,4,6-trimethylbenzoyl-diphenylphosphine oxide, and the like.

The photoinitiator may be present in an amount of 0.0001 parts by weight to 5 parts by weight, and, in an embodiment, 0.001 parts by weight to 3 parts by weight, and, in an embodiment, 0.001 parts by weight to 1 part by weight, relative to 100 parts by weight of the polymerization product including the hydroxyl group-containing (meth)acrylic copolymer or the monomer mixture. Within this range, complete curing can be obtained, reduction in light transmittance of the adhesive film due to a residue of the photoinitiator can be prevented or substantially prevented, and occurrence of bubbling can be prevented or substantially prevented while ensuring good reactivity.

In an embodiment, the adhesive composition may further include an additive. The additive may include any of typical additives known to those skilled in the art as being included in the adhesive composition. For example, the additive may include at least one selected from among a pigment, a UV absorber, a leveling agent, and an antistatic agent, without being limited thereto.

In another embodiment, the adhesive composition includes the polymerization product obtained by polymerization of the monomer mixture, the alkylene oxide cross-linking agent, and the photoinitiator.

The polymerization product is prepared by adding an amount (e.g., a predetermined amount) of the photoinitiator to the monomer mixture, followed by polymerization. The photoinitiator may include at least one selected from among the photoinitiators described above. In an embodiment, the monomer mixture includes the substituted monocyclic cyclyloxy group-containing (meth)acrylate.

The polymerization product may include a hydroxyl group- and substituted monocyclic cyclyloxy group-containing (meth)acrylic copolymer. In an embodiment, the polymerization product may include the hydroxyl group- and substituted monocyclic cyclyloxy group-containing (meth) acrylic copolymer and unpolymerized monomer residues.

The alkylene oxide cross-linking agent may be present in an amount of about 0.01 parts by weight to 5 parts by weight (for example, 0.01 parts by weight, 0.02 parts by weight, 0.03 parts by weight, 0.04 parts by weight, 0.05 parts by weight, 0.06 parts by weight, 0.07 parts by weight, 0.08 parts by weight. 0.09 parts by weight, 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, 1 part by weight, 2 parts by weight, 3 parts by weight, 4 parts by weight, or 5 parts by weight), and, in an embodiment, 0.01 parts by weight to 1 part by weight, relative to 100 parts by weight of the polymerization product including the hydroxyl group- and substituted monocyclic cyclyloxy group-containing (meth) acrylic copolymer or the monomer mixture. Within this range, the adhesive film can have improved flexibility and can be resistant to intrusion of moisture.

The photoinitiator may be present in an amount of about 0.0001 parts by weight to 5 parts by weight, and, in an embodiment, about 0.001 parts by weight to 3 parts by weight, and, in an embodiment, about 0.001 parts by weight to 1 part by weight, relative to about 100 parts by weight of the polymerization product including the hydroxyl group- and substituted monocyclic cyclyloxy group-containing (meth)acrylic copolymer or the monomer mixture. Within this range, complete curing can be obtained, reduction in light transmittance of the adhesive film due to a residue of the photoinitiator can be prevented or substantially prevented, and occurrence of bubbling can be prevented or substantially prevented while providing good reactivity.

Next, a scattering prevention film according to an embodiment of the present invention will be described.

The scattering prevention film includes a base film and an adhesive film formed on a lower surface of the base film, wherein the adhesive film is the adhesive film according to the present invention. The scattering prevention film is attached to a glass plate as an adherend via the adhesive film to protect the glass plate while preventing or substantially preventing scattering of the glass plate when the glass plate is broken. In addition, with the adhesive film according to the present invention, the scattering prevention film can have good flexibility and thus can be used in foldable display apparatuses.

The base film is an optically clear resin film and may include at least one selected from among: polyester resins, such as polyethylene terephthalate and polyethylene naphthalate; cellulose resins, such as triacetylcellulose; cyclic polyolefin resins, such as amorphous cyclic polyolefin; polyacrylate resins, such as polycarbonate resins, polyethersulfone resins, polysulfone resins, polyamide resins, polyimide resins, acyclic polyolefin resins, and polymethyl methacrylate resins; polyvinyl alcohol resins; polyvinyl chloride resins; and polyvinylidene chloride resins.

The base film may have a thickness of about 10 μm to about 500 μm, and, in an embodiment, about 50 μm to about 300 μm. Within this range, the base film can be used for the scattering prevention film. In addition, a functional coating layer, such as an anti-fingerprint layer, a hard coating layer, a UV absorbing layer, and a low-reflectivity layer, may be further formed on an upper surface of the base film to increase usefulness of the scattering prevention film.

The adhesive film is directly bonded to the lower surface of the base film. The adhesive film has high peel strength with respect to a glass plate as an adherend and can remain firmly attached to the adherend under repeated bending. Thus, the adhesive film is suitable for use as the scattering prevention film for foldable display apparatuses.

In addition, a release film for protection of the adhesive film may be further formed on a lower surface of the adhesive film.

An optical display apparatus according to embodiments of the present invention includes the adhesive film according to the present invention or the scattering prevention film according to the present invention.

The optical display apparatus may include a flexible display apparatus. However, it is to be understood that the present invention is not limited thereto and the optical display apparatus may include a non-flexible display apparatus. In one or more embodiments, the optical display apparatus may include an organic light emitting diode display apparatus, a liquid crystal display apparatus, and the like, without being limited thereto.

Next, the present invention will be described in further detail with reference to some examples. However, it should be noted that these examples are provided for illustration only and are not to be construed in any way as limiting the present invention.

EXAMPLE 1

As shown in Table 1, 100 parts by weight of a monomer mixture and 0.005 parts by weight of a photoinitiator (IRGACURE 651) were mixed thoroughly in a reactor. After replacing dissolved oxygen in the reactor with nitrogen gas, the monomer mixture was partially polymerized by UV irradiation using a low-pressure mercury lamp for several minutes, thereby preparing a viscous liquid having a viscosity of 500 cps to 5,000 cps at 25° C. The viscous liquid was composed of: a hydroxyl group-containing (meth) acrylic copolymer obtained by partial polymerization of the monomer mixture, and unpolymerized monomer residues.

Components as listed in Table 1 were added to and mixed with the prepared viscous liquid, followed by defoaming. The resultant was coated onto a polyethylene terephthalate (PET) film (thickness: 75 μm) as a release film, and then another PET film (thickness: 75 μm) was laminated onto the obtained coating layer, followed by UV irradiation at a fluence of 2,000 mJ/cm$^2$, thereby fabricating an adhesive sheet (PET film (thickness: 75 μm)/adhesive film (thickness: 25 μm)/PET film (thickness: 75 μm)).

In Table 1, "-" means that a corresponding component was not used.

EXAMPLES 2 to 3

Adhesive sheets (PET film/adhesive film/PET film) were fabricated in the same manner as in Example 1 except that the composition of the adhesive composition was changed as listed in Table 1.

COMPARATIVE EXAMPLES 1 to 3

Adhesive sheets (PET film/adhesive film/PET film) were fabricated in the same manner as in Example 1 except that the composition of the adhesive composition was changed as listed in Table 1.

The PET films were removed from each of the adhesive sheets fabricated in the Examples and Comparative Examples to obtain the adhesive film. The obtained adhesive film was evaluated as to the properties shown in Table 1. Results are shown in Table 1.

(1) Peel strength with respect to glass plate (unit: gf/in): Each of the adhesive sheets fabricated in the Examples and Comparative Examples were cut into a size of 2.5 cm×10 cm (width×length). One PET film was removed from the resultant to expose one surface of the adhesive film, which, in turn, was attached to a glass plate having a size of 5 cm×12 cm (width×length), followed by allowing a 2 kg roller to pass over the other PET film once. Thereafter, the adhesive sheet sample was left at 25° C. for 30 minutes, thereby preparing a specimen. Peel strength was measured on the specimen at a peel rate of 300 mm/min and a peel angle of 180° at 25° C. using a TA.XT_Plus Texture Analyzer (Stable Micro System).

(2) Peel Strength with respect to PET film (unit: gf/in): Using each of the adhesive sheets fabricated in the Examples and Comparative Examples, peel strength was measured according to the method of (1). Here, instead of the glass plate having a size of 5 cm×12 cm (width×length), a PET film having a size of 5 cm×12 cm (width×length) was used.

(3) Flexural reliability: A laminate as shown in FIG. 1A was fabricated and a specimen shown in FIG. 1B was fabricated using the laminate to evaluate flexural reliability. Referring to FIG. 1A, the laminate (10 cm×16 cm (width×length) was fabricated by laminating a glass plate 10 (thickness: 50 µm) and a PET film 30 (thickness: 50 µm) onto upper and lower surfaces of an adhesive film 20 (thickness: 25 µm) obtained from each of the adhesive sheets fabricated in the Examples and Comparative Examples, respectively.

Figure 1B:
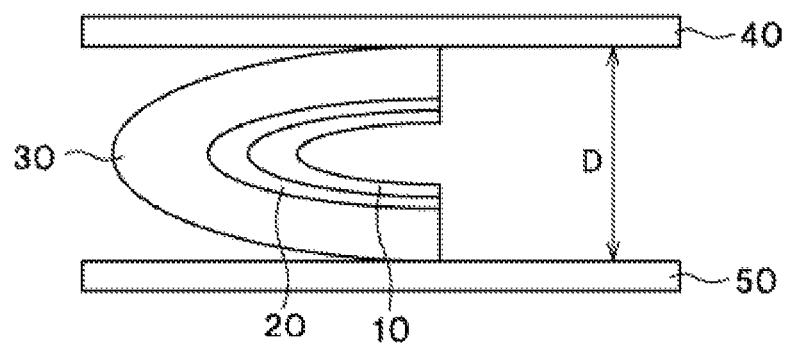
FIG. 1B shows a cross-sectional view of the specimen upon conducting evaluation of flexural reliability using the specimen.

Referring to FIG. 1B, the specimen for evaluation of flexural reliability was fabricated by bending and sandwiching the fabricated laminate between an upper jig 40 and a lower jig 50 such that the glass plate 10 was located at an innermost side. Here, a distance D between the upper jig 40 and the lower jig 50 was 5 mm.

The specimen was subjected to thermal shock evaluation conditions (100 cycles of maintaining the specimen at 40° C. for 30 minutes, heating the specimen from −40° C. to 80° C. for 10 minutes, maintaining the specimen at 80° C. for 30 minutes, and cooling the specimen from 80° C. to −40° C. for 10 minutes). When cracks occurred in one or more of the glass plate, the adhesive film, and the PET film, a corresponding specimen was rated as "NG," and, when no cracks occurred in the glass plate, the adhesive film, and the PET film, a corresponding specimen was rated as "OK."

(4) Storage modulus (unit: kPa): Viscoelasticity was measured at a shear rate of 1 rad/sec and a strain of 1% in the auto-strain mode using a rheometer (MCR-501, Anton Paar Co., Ltd.) as a dynamic viscoelasticity meter. Specifically, multiple adhesive films obtained from each of the adhesive sheets fabricated in the Examples and Comparative Examples were laminated together to a thickness of 400 µm. Then, the laminate was punched using an 8 mm-diameter punching machine, thereby preparing a specimen. With a normal force of 3 N applied to the specimen using 8 mm jigs, storage modulus was measured on the specimen while heating the specimen from −60° C. to 90° C. at a heating rate of 5° C./min. Here, storage modulus at each of −20° C., 25° C., and 80° C. was recorded.

TABLE 1

| | | Example | | | Comparative Example | | |
|---|---|---|---|---|---|---|---|
| | | 1 | 2 | 3 | 1 | 2 | 3 |
| Monomer mixture | 2-EHA | 75 | 75 | 75 | 75 | 75 | 70 |
| | 2-HEA | 15 | 15 | — | — | 15 | 10 |
| | 4-HBA | 5 | 5 | 20 | 20 | 5 | — |
| | IBXA | — | — | — | — | — | 10 |
| | ACMO | 5 | 5 | 5 | 5 | 5 | 10 |
| Other components | IRGACURE 651 | 0.2 | 0.2 | 0.2 | 0.2 | 0.2 | 0.2 |
| | TPO | 0.1 | 0.1 | 0.1 | 0.1 | 0.1 | 0.1 |
| | MF-001 | 0.1 | 0.1 | 0.1 | — | 0.1 | 0.1 |
| | HDDA | — | — | — | 0.1 | — | — |
| | TMCHA | 1 | 10 | — | — | — | — |
| | TBCHA | — | — | 5 | 5 | — | — |
| | CA | — | — | — | 1 | 1 | — |
| Peel strength (@glass plate) | | 1000 | 1200 | 950 | 980 | 1100 | 1350 |
| Peel strength (@PET film) | | 1250 | 1350 | 1100 | 970 | 900 | 1000 |
| Flexural reliability under thermal shock | | OK | OK | OK | NG | NG | NG |
| Storage modulus | @−20° C. | 90 | 98 | 95 | 110 | 130 | 350 |
| | @25° C. | 35 | 38 | 36 | 42 | 45 | 65 |
| | @85° C. | 25 | 28 | 20 | 28 | 30 | 40 |

*2-EHA: 2-ethylhexyl acrylate;
*2-HEA: 2-hydroxyethyl acrylate;
*4-HBA: 4-hydroxybutyl acrylate;
*IBXA: Isobornyl acrylate;
*ACMO: Acryloylmorpholine;
*IRGACURE 651, TPO: Photoinitiator;
*MF-001: Ethylene oxide-based penta-functional (meth)acrylate;
*HDDA: 1,6-hexanediol diacrylate;
*TMCHA: 3,3,5-trimethylcyclohexyl acrylate;
*TBCHA: 4-ter-butylcyclohexyl acrylate;
*CA: Cyclohexyl acrylate As shown in Table 1, it can be seen that the adhesive film according to the present invention had good peel strength with respect to both a glass plate and a PET film and good flexibility under thermal shock conditions and could be useful as a scattering prevention film for foldable display apparatuses.

Conversely, the adhesive film of Comparative Example 1, including a cross-linking agent other than the alkylene oxide cross-linking agent according to the present invention, and the adhesive film of Comparative Example 2, free from the substituted monocyclic cyclyloxy group, failed to provide the effects of the present invention. In addition, the adhesive film of Comparative Example 3, free from the substituted monocyclic cyclyloxy group, exhibited poor flexibility under thermal shock conditions.

While some embodiments have been described herein, it is to be understood that various modifications, changes, alterations, and equivalent embodiments can be made by those skilled in the art without departing from the spirit and scope of the invention.

What is claimed is:

1. An adhesive film formed of an adhesive composition comprising: a polymerization product of a monomer mixture comprising a hydroxyl group-containing (meth)acrylate; an alkylene oxide cross-linking agent; and a (meth)acrylate comprising a substituted monocyclic cyclyloxy group,
    wherein the adhesive film has a peel strength of about 950 gf/in or more, as measured with respect to a glass plate at about 25° C.,
    wherein the monomer mixture does not comprise the (meth)acrylate comprising the substituted monocyclic cyclyloxy group,
    wherein the substituted monocyclic cyclyloxy group is substituted with a substituent selected from among a $C_1$ to $C_{10}$ alkyl group, a $C_6$ to $C_{20}$ aryl group, and a $C_7$ to $C_{20}$ arylalkyl group, and
    the adhesive composition comprises about 0.5 parts by weight to 10 parts by weight of the (meth)acrylate comprising the substituted monocyclic cyclyloxy group relative to 100 parts by weight of the polymerization product.

2. The adhesive film according to claim 1, wherein the substituted monocyclic cyclyloxy group of the (meth)acrylate comprising the substituted monocyclic cyclyloxy group is a substituted $C_5$ to $C_{10}$ monocyclic cyclyloxy group.

3. The adhesive film according to claim 1, wherein the substituted monocyclic cyclyloxy group of the (meth)acrylate comprising the substituted monocyclic cyclyloxy group is obtained by substituting a hydrogen atom thereof with a methyl group or a branched $C_3$ to $C_{10}$ alkyl group.

4. The adhesive film according to claim 1, wherein the substituted monocyclic cyclyloxy group of the (meth)acrylate comprising the substituted monocyclic cyclyloxy group is derived from at least one selected from among trimethylcyclohexyl (meth)acrylate and tert-butylcyclohexyl (meth)acrylate.

5. The adhesive film according to claim 1, wherein the alkylene oxide cross-linking agent has an ethylene oxide group or a propylene oxide group and two to six (meth)acrylate groups.

6. The adhesive film according to claim 1, wherein the monomer mixture further comprises an alkyl group-containing (meth)acrylate, and a heteroalicyclic group-containing monomer.

7. The adhesive film according to claim 6, wherein the monomer mixture comprises about 5 wt % to about 40 wt % of the hydroxyl group-containing (meth)acrylate, about 50 wt % to about 90 wt % of the alkyl group-containing (meth)acrylate, and about 1 wt % to about 20 wt % of the heteroalicyclic group-containing monomer.

8. The adhesive film according to claim 1, wherein the alkylene oxide cross-linking agent is present in an amount of about 0.01 parts by weight to about 5 parts by weight relative to about 100 parts by weight of the polymerization product.

9. The adhesive film according to claim 1, wherein the (meth)acrylate comprising the substituted monocyclic cyclyloxy group is present in an amount of 1 part by weight to 10 parts by weight relative to about 100 parts by weight of the polymerization product.

10. The adhesive film according to claim 1, wherein the adhesive composition further comprises a photoinitiator.

11. The adhesive film according to claim 1, wherein the adhesive film has a storage modulus of about 200 kPa or less at about 25° C.

12. A scattering prevention film comprising:
a base film; and
an adhesive film on a lower surface of the base film, the adhesive film comprising the adhesive film according to claim 1.

13. The scattering prevention film according to claim 12, further comprising a functional coating layer on an upper surface of the base film, the functional coating layer comprising at least one selected from among an anti-fingerprint layer, a hard coating layer, a UV absorbing layer, and a low-reflectivity layer.

14. An optical display apparatus comprising the scattering prevention film according to claim 12.

15. A scattering prevention film comprising:
a base film; and
an adhesive film on a lower surface of the base film,
wherein the adhesive film is formed of an adhesive composition comprising: a polymerization product of a monomer mixture comprising a hydroxyl group-containing (meth)acrylate; an alkylene oxide cross-linking agent; and a (meth)acrylate comprising a substituted monocyclic cyclyloxy group,
wherein the adhesive film has a peel strength of about 950 gf/in or more, as measured with respect to a glass plate at about 25° C.,
wherein the monomer mixture does not comprise the (meth)acrylate comprising the substituted monocyclic cyclyloxy group,
wherein the substituted monocyclic cyclyloxy group is substituted with a substituent selected from among a $C_1$ to $C_{10}$ alkyl group, a $C_6$ to $C_{20}$ aryl group, and a $C_7$ to $C_{20}$ arylalkyl group, and
the adhesive composition comprises about 0.5 parts by weight to 10 parts by weight of the (meth)acrylate comprising the substituted monocyclic cyclyloxy group relative to 100 parts by weight of the polymerization product.

16. The scattering prevention film according to claim 15, further comprising a functional coating layer on an upper surface of the base film, the functional coating layer comprising at least one selected from among an anti-fingerprint layer, a hard coating layer, a UV absorbing layer, and a low-reflectivity layer.

17. An optical display apparatus comprising the scattering prevention film according to claim 15.

* * * * *